United States Patent [19]

Küppers

[11] Patent Number: 5,048,170
[45] Date of Patent: Sep. 17, 1991

[54] APPARATUS FOR FITTING FLEXIBLE STRIPS

[75] Inventor: Jürgen Küppers, Mönchengladbach, Fed. Rep. of Germany

[73] Assignee: Draftex Industries Limited, Edinburgh, Scotland

[21] Appl. No.: 601,339

[22] Filed: Oct. 22, 1990

[30] Foreign Application Priority Data

Nov. 22, 1989 [GB] United Kingdom ............... 8926348

[51] Int. Cl.⁵ .................... B23P 21/00; B23Q 15/00
[52] U.S. Cl. .................................................. 29/235
[58] Field of Search ............... 29/450, 451, 417, 235, 29/701; 198/428, 617; 414/744 A, 225, 786; 901/41, 36, 31, 37, 26; 269/329

[56] References Cited

U.S. PATENT DOCUMENTS

| | | | |
|---|---|---|---|
| 3,505,725 | 4/1970 | Curry ............................ | 29/235 |
| 4,760,636 | 8/1988 | Angelo et al. ................. | 29/235 |
| 4,777,709 | 10/1988 | Burger et al. . | |

FOREIGN PATENT DOCUMENTS

| | | |
|---|---|---|
| 0110156 | 6/1984 | European Pat. Off. . |
| 1588213 | 4/1981 | United Kingdom . |
| 1588214 | 4/1981 | United Kingdom . |

*Primary Examiner*—Robert C. Watson
*Attorney, Agent, or Firm*—Leydig, Voit & Mayer

[57] ABSTRACT

A tool for fitting a channel-shaped sealing strip onto a flange running around a door opening, such as of a vehicle, comprises a body supporting a channel-shaped guide. Initially, the guide is used to pick up a completely closed loop of the strip, a keeper than being slid over the guide to retain the strip in position. The tool now carrying the seal is then moved towards the flange and turned through approximately 90° so that two contra-rotatable rollers engage the sides of the strip on the flange and another roller engages the base of the strip. The rollers engaging the sides of the are then energized so that the tool drives around the flange, forcing the strip into position.

13 Claims, 3 Drawing Sheets

APPARATUS FOR FITTING FLEXIBLE STRIPS

BACKGROUND OF THE INVENTION

The invention relates to apparatus for fitting flexible strips. For example, such a strip may be a sealing strip which is required to be fitted around a door or other closable opening on a motor vehicle body.

SUMMARY OF THE INVENTION

According to the invention, there is provided a tool for fitting a length of channel-shaped strip onto a mounting flange or the like, comprising guide means shaped to receive the strip slidably, locking means for holding the strip in the guide means but permitting its sliding therein, and strip pressing means carried by the tool for pressing the strip onto the flange at a position adjacent to but spaced from the end of the guide means so that the strip slides through the guide means as the tool moves along the flange and continues to pres the seal thereon.

According to the invention, there is further provided a tool for use in assembling a channel-shaped seal onto a flange running around a door or similar opening on a motor vehicle body, the seal being in the form of a closed ring sized to fit the periphery of the flange, the tool comprising a body housing a motor, two contra-rotatable rollers connected to be driven by the motor and rotatable about Parallel spaced-apart axes, an open-mouthed guide channel mounted on the body with its mouth facing outwardly of the tool and spaced from the rollers and running in a direction parallel to their axes, the guide channel being sized for slidably receiving the seal, keePer means for releasably locking the seal in the guide channel but without affecting the sliding of the seal therein, whereby the seal locked in the guide channel may be carried by the tool towards and into embracing relationship with the flange so that the rollers engage opposite sides of the seal on the flange and travel therealong when the motor is energised and thereby to assemble the comPlete ring onto the flange.

DESCRIPTION OF THE DRAWINGS

Tools embodying the invention for fitting a sealing strip to the door surround of a motor vehicle body will now be described, by way of example only, with reference to the accompanying diagrammatic drawings in which.

DESCRIPTION OF PREFERRED EMBODIMENTS

Figure 1:
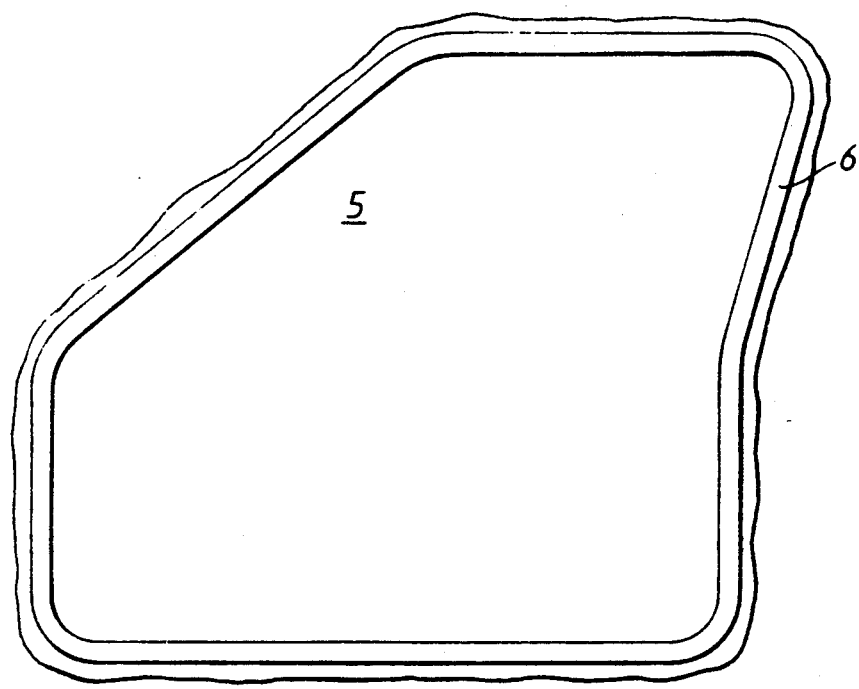
FIG. 1 is a side view of the door surround.
Figure 2:
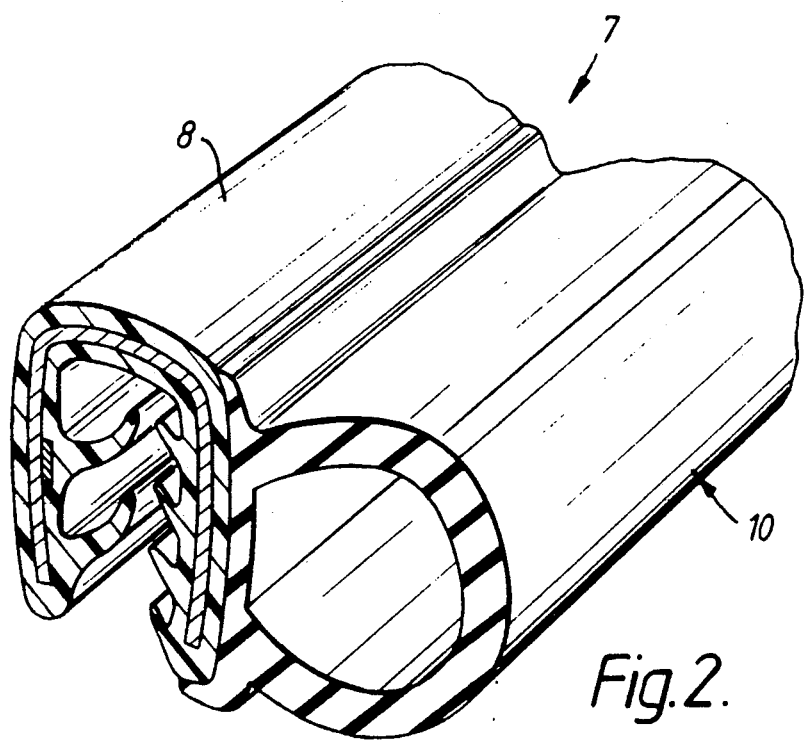
FIG. 2 is a perspective sectional view of the sealing strip.
Figure 3:
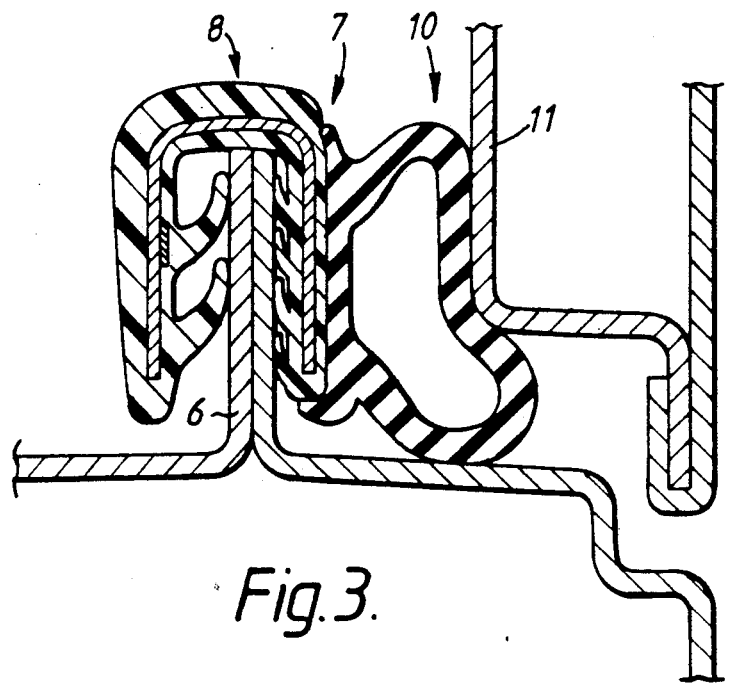
FIG. 3 is a cross-sectional view of the sealing strip in position on the door surround.

FIG. 1 shows a door opening 5 of a motor vehicle body. The door opening is defined by a flange 6 which is formed where the inner and outer skins of the body are welded together. In order to provide a seal for the door opening 5, the manufacture of the vehicle body involves the fitting of a door seal (see FIG. 2) onto the flange 6. As shown in FIG. 2, the door seal 7 comprises a channel-shaped gripping section 8 which, in use, embracingly rips the flange 6 and supports a soft tubular sealing section 10, so that the seal runs around the door opening, with the sealing section 10 on the outside of the opening. As shown in FIG. 3, when the door (part of which is shown diagrammatically at 11) closes onto the opening, it partially compresses the tubular sealing section 10 so as to form a weather-proof seal. The tools and methods now to be described are concerned with the automatic or semi-automatic fitting of the door seal 7 onto the flange 6.

The tool (FIGS. 4 and 6) comprises a body 30 which is generally right-angled in configuration and carries two rotatable rollers 32 and 34 (the latter being shown partially dotted) which are rotatable about parallel axes. A third roller 36 is rotatably mounted on two supports (only one visible as shown at 38) so that its axis of rotation is perpendicular to the axe of the rollers 32 and 34.

The rollers 32 and 34 are preferably driven by means of a motor, such as a pneumatic motor for example, mounted in the part 30A of the body 30. The rollers 32 and 34 are gearingly connected to each other so as to rotate in opposite directions. Advantageously, the separation between their axes is adjustable. The roller 36 is not driven.

Mounted on one side of the body part 30A is channel-shaped guide 40.

Supports 42 and 44 are mounted on the outside of the body part 30A, and a similar support (not visible) is mounted on the opposite of the body portion 30A to the support 42. These three supports carry a ring 46 on which is slidably mounted a keeper 48.

The tool may be designed to be hand-held, the operator supporting it by means of a handle 50. In such a case, the weight of the tool would advantageously be mainly supported by a flexible cable adjacent to the assembly line on which the tool would be used. Instead, and advantageously, the tool can be carried by a robot (not shown) to which it would be attached by means of the handle 50.

In each case, a suitable pneumatic supply for the motor within the body part 30 would be fed through the handle part 50.

Door seals may be supplied to car manufacturers either in the form of a complete ring or in the form of a predetermined o indeterminate length. The tool shown is particularly suitable for fitting a door seal in the form of a complete ring. In such a case, the tool is offered up (either manually or by the robot) to the ring-shaped seal, with the keeper 48 in the position shown in FIG. 4. The ring-shaped seal 7A (see FIG. 5) can thus be received in the open channel-shaped guide 40 whose width is such as comfortably to receive and locate the seal as shown in the FIGURE. Initially, the tool would have the orientation shown in FIG. 5 with reference to the ring 7A, so that the rollers 32, 34 and 36 would be clear of the seal 7. In other words, in this position the ring 7A would effectively be completely carried by the tool. The keeper 48 would then be slid over the guide 40 and into the position shown in FIG. 6. The ring 7A is now prevented from falling out of the guide. Such movement of the keeper 48 could be carried out manually by the operator or automatically by the robot such as by means of a suitable piston-cylinder arrangement carried by the tool.

Figure 4:
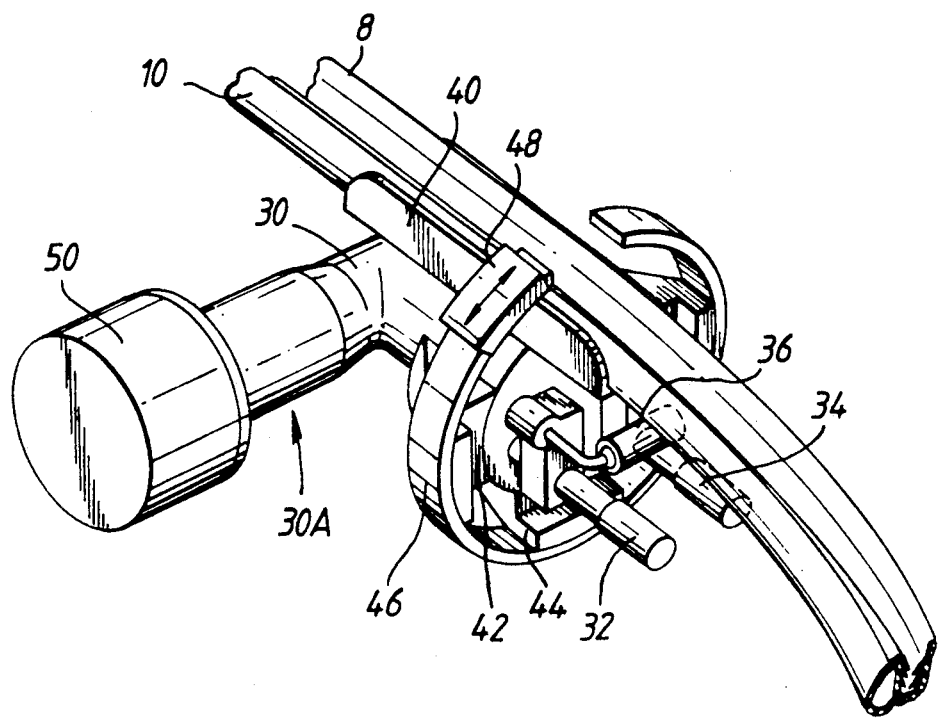
FIG. 4 is a perspective view of one of the tools in a seal pick-up condition.
Figure 5:
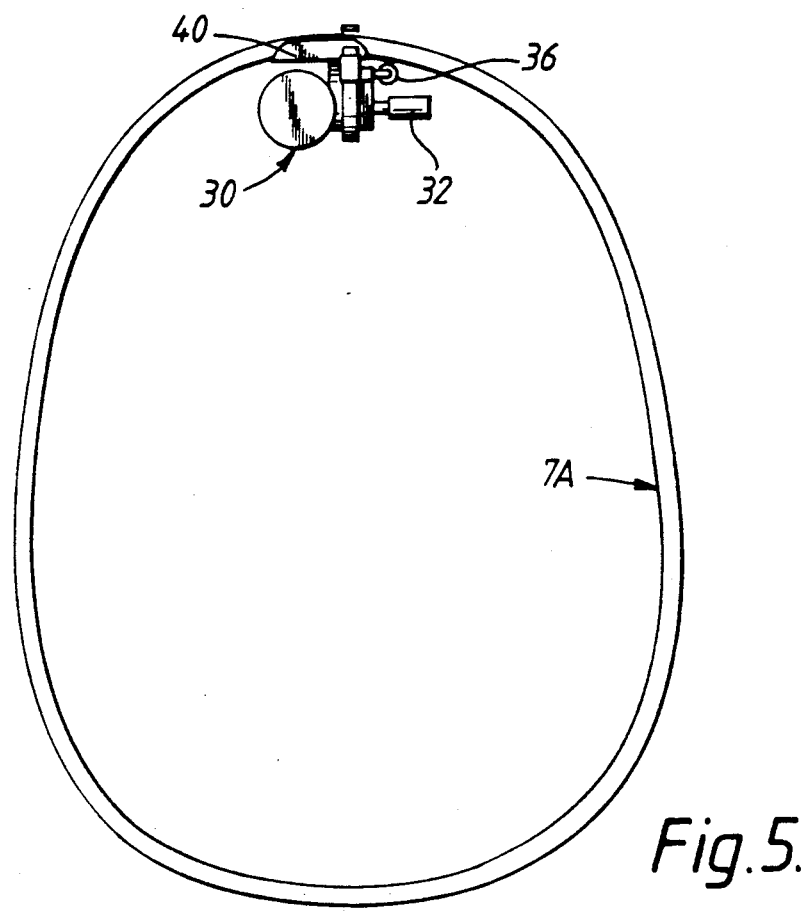
FIG. 5 is a view showing the tool in a condition corresponding to that shown in FIG. 4 but to smaller scale.
Figure 6:
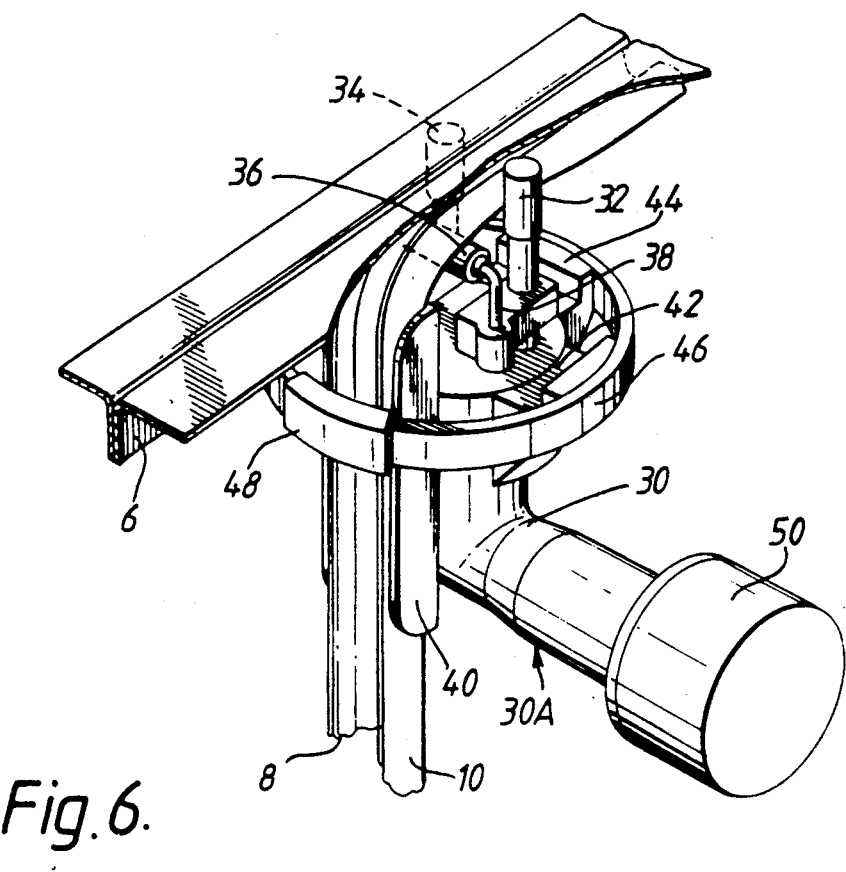
FIG. 6 corresponds to FIG. 4 but shows the tool applying the seal to the door surround.

In FIGS. 4 and 5, the seal 7 is of course completely clear of the flange. The operator, or the robot, as the case may be, then moves the tool, with the ring 7A carried by it, towards the flange 6 and turns the tool through approximately 90° so as to press a portion of the seal onto the flange, as shown in FIG. 6, the roller 36 engaging the base of the outside of the channel of the gripping section 8 and the rollers 32 and 3 engaging the outside of the seal. The drive motor for the rollers 32 and 34 is now energised and causes the tool to be frictionally driven lengthwise along the flange 6, pressing the seal onto the flange as it travels. During this process, the operator, or the robot, as the case may be, swivels the tool as necessary at each of the corners or bends in the flange.

Immediately before the final part of the seal is pressed onto the flange, the keeper 48 is slid back to the position shown in FIG. 4. The remaining small part of the seal is then pressed onto the flange by the tool which is then disengaged from the seal and the flange.

If the separation between the rollers 32 and 34 is adjustable, the step of engaging the seal onto the flange initially can be facilitated by temporarily increasing the separation between these rollers, and thereafter bringing them towards each other when the seal is in position.

The tool may advantageously be used to facilitate the fitting of the type of seal shown in our co-pending United Kingdom patent application No. 8727690 (Publication No. 2212844), but may be used for other types of seal as well.

What is claimed is:

1. A tool for fitting a length of channel-shaped strip into a mounting flange or the like, comprising
   an open mouth guide channel mounted on the tool and shaped and sized to receive the strip slidably,
   retaining means for holding the strip in the guide channel by permitting its sliding therein and comprising a keeper slidable between a free position clear of the guide channel and a retaining position in which it bridges across the mouth of the guide channel, and
   two rotatable rollers rotatable about parallel axes and carried by the tool and positioned to engage opposite sides of the strip for pressing the strip onto the flange at a position adjacent to but spaced from the end of the guide channel so that the strip slides through the guide channel as the tool moves along the flange and presses the strip thereon.

2. A tool according to claim 1, in which the strip carries a relatively soft sealing part running along the outside of one of the side walls of the channel thereof, and the said rollers are spaced apart such that one engages this sealing part and the other engages the opposite side wall of the channel.

3. A tool according to claim 1 including a third rotatably mounted roller positioned to engage the outside of the base of the channel of the strip.

4. A tool according to claim 1 in which the two rollers are connected to be contra-rotatably driven by a motor carried by the tool.

5. A tool according to claim 1 in which the guide channel runs in a direction which is substantially parallel to the direction of the axes of the said two rotatable rollers.

6. A tool for fitting a channel-shaped strip onto a mounting flange or the like, the strip being in the form of a closed loop sized to fit the length of the flange, the tool comprising
   an open mouthed guide channel mounted on the tool and shaped and sized to receive the strip slidably
   retaining means for holding the strip in the guide channel but permitting its sliding therein, the retaining means comprising a keeper slidable between a free position clear of the guide channel and a retaining position in which it bridges across the mouth of the guide channel, the keeper being slidably mounted on a ring-shaped mount having a gap therethrough, the mount being positioned so as to embrace the guide channel with the direction of extension of the guide channel being perpendicular to the plane within the mount and with the gap through the mount in alignment with the open mouth of the guide channel so as to allow entry of the strip into the guide channel through the gap, the gap thereafter being closed by the keeper, and
   two rotatable rollers carried by the tool and rotatable about parallel axes and positioned to engage opposite sides of the strip at a position adjacent to but spaced from the end of the guide channel so that the strip slides through the guide channel as the tool moves along the flange and presses the strip thereon.

7. A tool according to claim 1 adapted to be carried by a robot.

8. A tool for use in assembling a channel-shaped seal onto a flange running around a door or similar opening on a motor vehicle body, the seal being in the form of a closed ring sized to fit the periphery of the flange, the tool comprising
   a body housing a motor,
   two contra-rotatable rollers connected to be driven by the motor and rotatable about parallel spaced-apart axes,
   an open-mouthed guide channel mounted on the body with its mouth facing outwardly of the tool and spaced from the rollers and running in a direction parallel to their axes, the guide channel being sized for slidably receiving the seal,
   keeper means for releasably locking the seal in the guide channel but without affecting the sliding of the seal therein, whereby the seal locked in the guide channel may be carried by the tool towards and into embracing relationship with the flange so that the rollers engage opposite sides of the seal o the flange and travel therealong when the motor is energised and thereby to assemble the complete ring onto the flange.

9. A tool according to claim 8 including a third roller mounted adjacent to the first two rollers and rotatable about an axis perpendicular to their axes so as to engage the outside of the base of the seal.

10. A tool according to claim 6 in which the strip carries a relatively soft sealing part running along the outside of one of the side walls of the channel thereof, and the said rollers are spaced apart such that one engages this sealing part and the other engages the opposite side wall of the channel.

11. A tool according to claim 6 including a third rotatably mounted roller positioned to engage the outside of the base of the channel of the strip.

12. A tool according to claim 6 in which the two rollers are connected to be contra-rotatably driven by a motor carried by the tool.

13. A tool according to claim 6 adapted to be carried by a robot.

* * * * *